(12) United States Patent
Wu et al.

(10) Patent No.: US 8,392,646 B2
(45) Date of Patent: Mar. 5, 2013

(54) PROGRAMMABLE CONTROLLED COMPUTER SWITCH

(75) Inventors: Hung-June Wu, Banciao (TW); Cheng-Sheng Chou, Banciao (TW)

(73) Assignee: June-On Co., Ltd., Banciao (TW)

( * ) Notice: Subject to any disclaimer, the term of this patent is extended or adjusted under 35 U.S.C. 154(b) by 379 days.

(21) Appl. No.: 12/662,346

(22) Filed: Apr. 13, 2010

(65) Prior Publication Data
US 2011/0213909 A1 Sep. 1, 2011

(30) Foreign Application Priority Data
Feb. 26, 2010 (TW) .................. 99105694 A

(51) Int. Cl.
*G06F 13/00* (2006.01)
(52) U.S. Cl. ........... 710/316; 710/317; 710/72; 710/305
(58) Field of Classification Search .......... 710/316–317, 710/72, 305–306
See application file for complete search history.

(56) References Cited

U.S. PATENT DOCUMENTS

| 7,721,028 B2* | 5/2010 | Chien ............................ 710/72 |
| 2011/0040921 A1* | 2/2011 | Chou et al. ..................... 710/316 |

* cited by examiner

*Primary Examiner* — Brian Misiura
*Assistant Examiner* — Kim Huynh
(74) *Attorney, Agent, or Firm* — Bacon & Thomas, PLLC

(57) ABSTRACT

A programmable controlled computer switch is disclosed. Console devices and universal serial bus devices of the computer switch can be switched as having a controlling function or a hub function. The computer switch includes a console port interface having console ports for connecting console devices, which initially have a controlling function; a universal serial bus hub port interface having hub ports for connecting universal serial bus devices, which initially have a hub function; plural computer interfaces having a computer port respectively for connecting a computer device; a matrix switching circuit connected to the console port interface, the universal serial bus hub port interface and the plural computer interfaces; and a main controlling circuit connected between the matrix switching circuit and the plural computer interfaces.

10 Claims, 3 Drawing Sheets

PROGRAMMABLE CONTROLLED COMPUTER SWITCH

FIELD OF THE INVENTION

The present invention relates to a programmable controlled computer switch. More specifically, the present invention relates to a computer switch capable of switching between a controlling function and a hub function for a console device and a universal serial bus device.

BACKGROUND

Conventionally, a computer system comprises a computer device, a mouse, a keyboard, a monitor, a speaker and a video apparatus. In general, the mouse, the keyboard, the monitor, the speaker and the video apparatus are referred to as console devices that are used for controlling the computer device or controlled by the computer device. A computer switch is provided among various console devices and plural computer devices. The computer switch selects one of the plural computer devices so that the console devices may control the selected computer device and output instructions to the selected computer device or input the response from the selected computer device. Moreover, there is provided a universal serial bus (referred to as USB hereinafter) hub port on the computer switch for connecting USB devices. The USB devices on the computer switch, however, only control one of the plural computer devices or are controlled by one of the computer devices. In other words, the USB devices do not have the controlling functions of controlling the plural computer device and switching as the console devices. Referring to FIG. 3, it illustrates a computer switch of prior art. The conventional computer switch 300 includes a USB hub port interface 301 for connecting one or more external USB devices 301-1 to 301-4, such as hard drives, mice, keyboards, printers, etc.; a console port interface 302 for connecting one or more console devices 302-1 to 302-2; a matrix switching circuit 303 connected to plural computer interfaces 305 (N computer interfaces in FIG. 3), the USB hub port interface 301 and the console port interface 302; and a main controlling circuit connected to the plural computer interfaces 305 and the matrix switching circuit 303. The computer interfaces 305 connect to a computer device such as a personal computer, a notebook, a smart phone and a personal digital assistant (PDA) (not shown in FIG. 3) respectively. As can be seen from FIG. 3, the console devices 302-1 to 302-2 connect to the main controlling circuit 304 through the console port switching interface 3031 in the matrix switching circuit 303 so as to control plural computer interfaces 305. In contrast, the USB devices 301-1 to 301-4 connect to and transmit signals to one of the N computer interfaces 305 respectively through the matrix switching circuit 303 or are controlled by the computer device to which the selected computer interface 305 is connected. For example, in FIG. 3, USB device 301-1 connects to the first computer interface 305 through the matrix switching circuit 303; USB device 301-2 connects to the second computer interface 305 through the matrix switching circuit 303. Further, the matrix switching circuit 303 determines the connecting relationship between the USB devices 301-1 to 301-4 and the computer interfaces 305.

Apparently, the above construction doesn't meet various conditions or special operational needs. This is because that the USB devices 301-1 to 301-4 connected to the USB hub port interface 301 only has a hub function, not a controlling function such as instructing each computer interface 305, switching among the computer interfaces 305, etc. When the computer switch 300 and the console devices 302-1 to 302-2 connected to the console port interface 302 are provided in different places, the problem is more troublesome. For example, when the computer switch 300 is provided in the machine room and the console devices 302-1 to 302-2 are provided in the control room, the user can't control and switch the unconnected computer interfaces 305 via the proximate USB devices 301-1 to 301-4. The user switches and controls the unconnected computer interfaces 305 only by the console devices 302-1 to 302-2. Thus the need rises in maintenance and special operational environment.

SUMMARY

Due to the limitation in the above structure, there is a programmable controlled computer switch disclosed by the present invention. The programmable controlled computer switch may be capable of switching between a controlling function and a hub function for a console device and a universal serial bus device.

The computer switch according to an embodiment of the present invention includes a console port interface having a console port for connecting console devices which initially have a controlling function; a USB hub port interface having hub ports for connecting USB devices, which initially have a hub function; plural computer interfaces having a computer port respectively for connecting a computer device; a matrix switching circuit connected to the console port interface, the universal serial bus hub port interface and the plural computer interfaces; and a main controlling circuit connected between the matrix switching circuit and the plural computer interfaces. The main controlling circuit maintains the console devices as having a controlling function or switches the console devices as having a hub function while maintains the USB devices as having a hub function or switched the USB devices as having a controlling function. The main controlling circuit transmits controlling signals from the devices having a controlling function to the plural computer devices through a bus.

According to the present invention, one or more of the USB devices connected to the USB hub port interface may control the plural computer interfaces to achieve the effect of multi-user and multi-console. Alternatively the console devices connected to the console port interface may directly connect to one of the plural computer devices though the matrix switching circuit so as to have a hub function.

DETAILED DESCRIPTION

Figure 1:
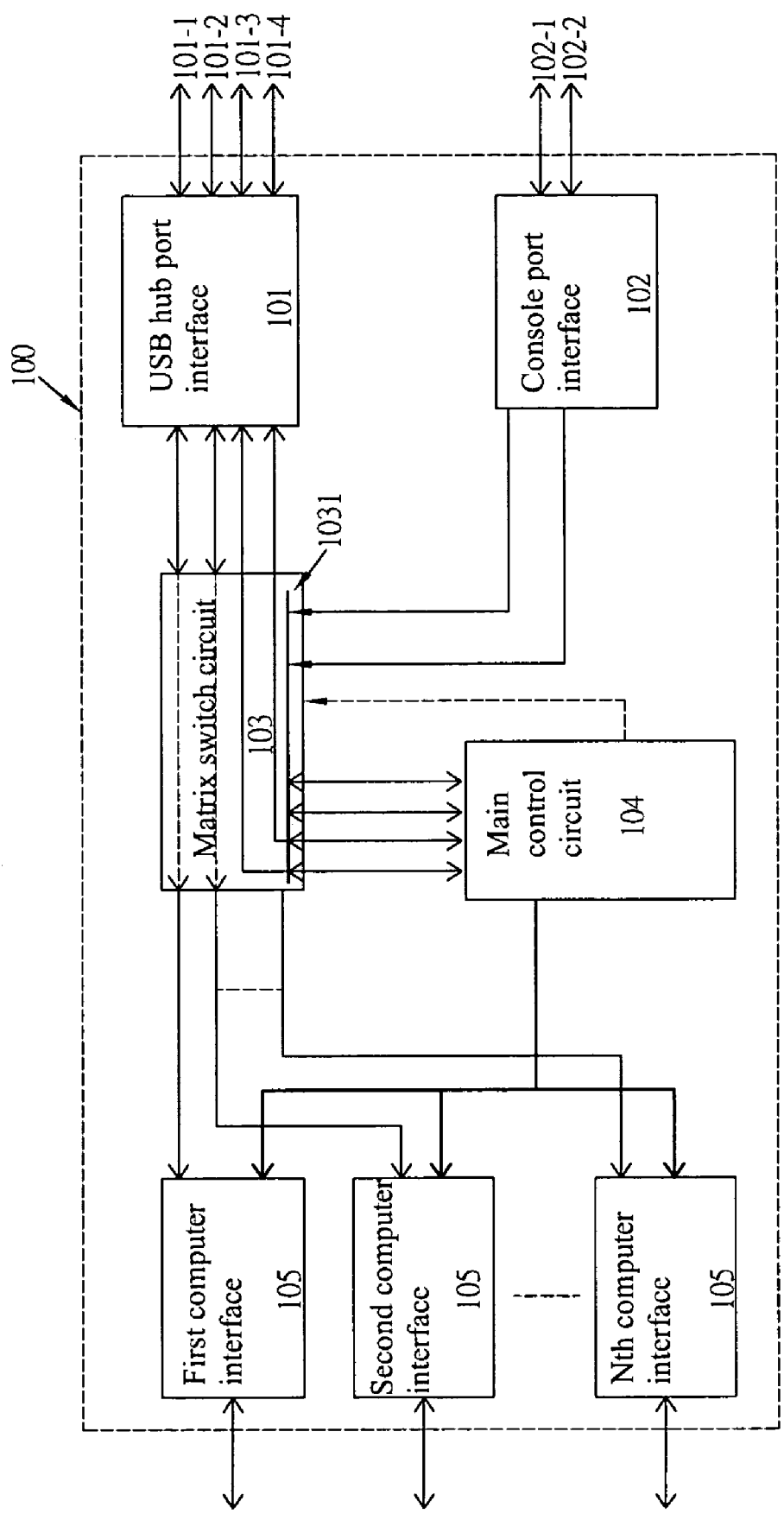
FIG. 1 is a block diagram of the computer switch according to an embodiment of the present invention.
Figure 2:
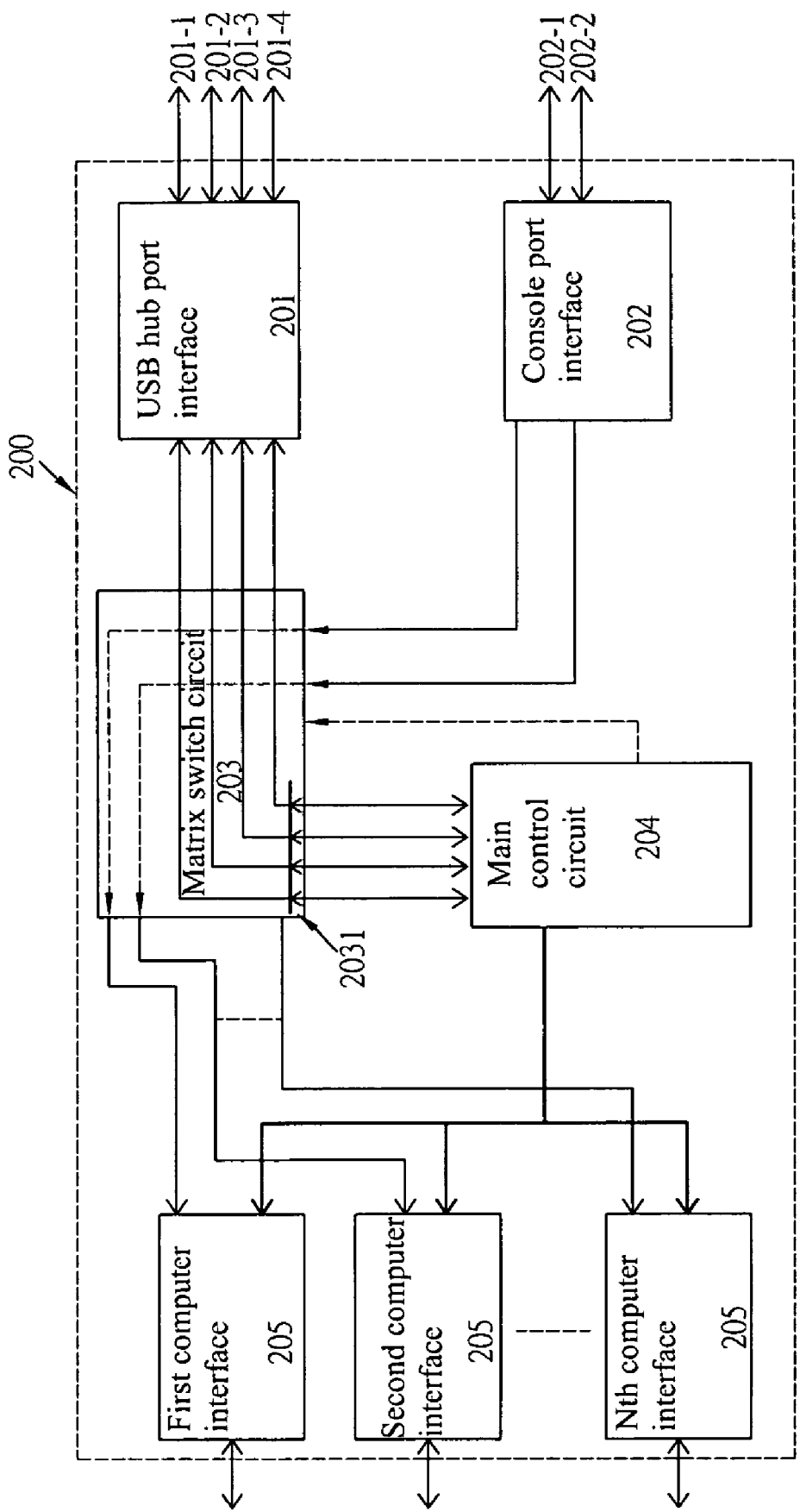
FIG. 2 is a block diagram of the computer switch according to another embodiment of the present invention.
Figure 3:
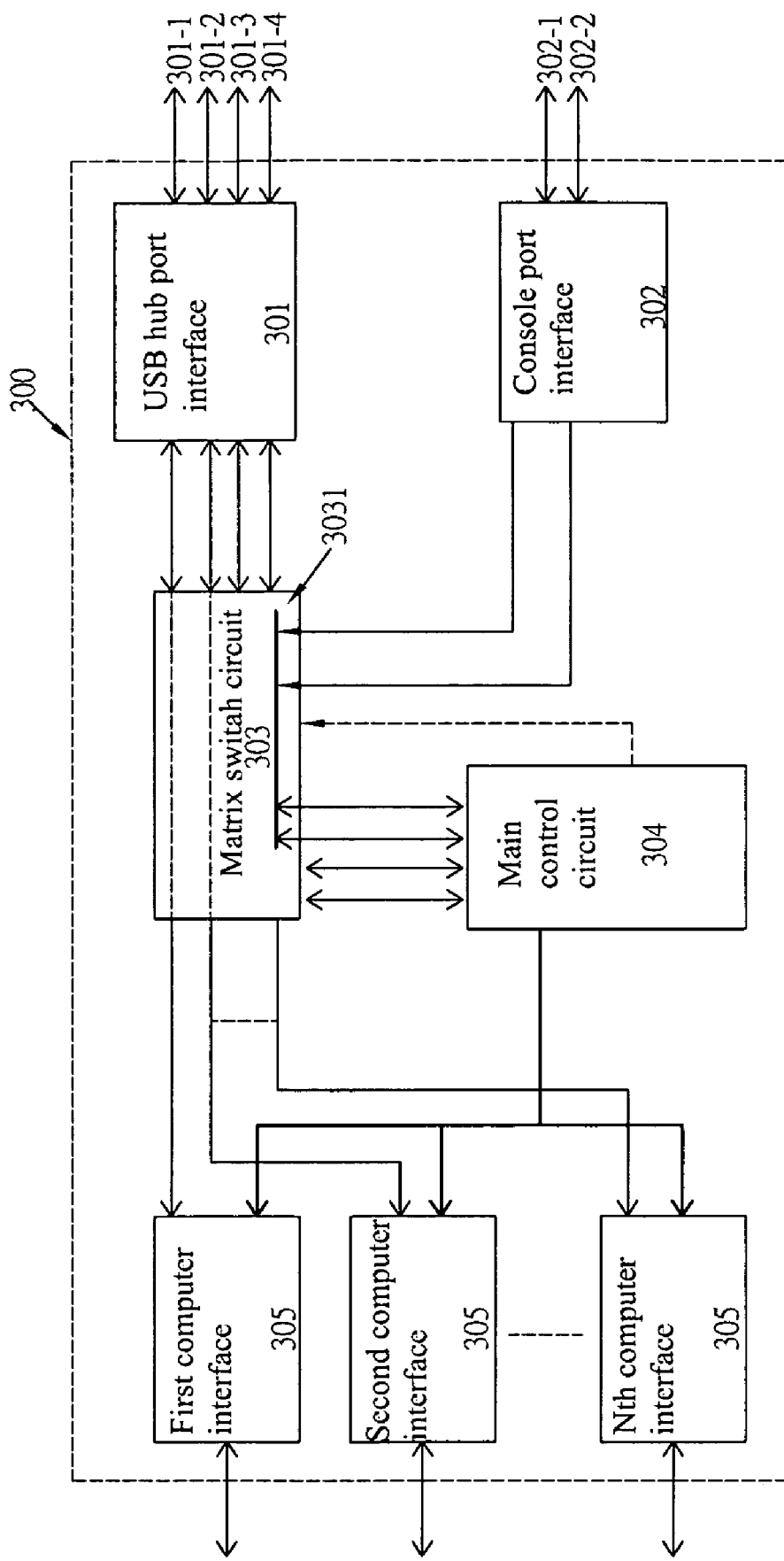
FIG. 3 is a block diagram of the computer switch in prior art.

Referring to FIG. 1, it is a block diagram of the computer switch according to an embodiment of the present invention. Computer switch 100 includes a console port interface 102 having a console port for connecting console devices 102-1 to 102-2 which initially have a controlling function; a USB hub port interface 101 having hub ports for connecting USB devices 101-1 to 101-4, which initially have a hub function; plural computer interfaces 105 (N computer interface in the embodiment) having a computer port respectively for connecting a computer device(not shown); a matrix switching circuit 103 connected to the console port interface 102, the USB hub port interface 101 and the plural computer interfaces 105; and a main controlling circuit 104 connected between the matrix switching circuit 103 and the plural computer interfaces 105. Note, the number of the USB devices or the console devices is not limited by the figure. The USB devices 101-1 to 101-4 are switched as having a controlling function or maintained the original hub function according to the type of the connected devices or according to the controlling instructions from the devices having a controlling function. Note, the USB devices having a hub function are directly connected to one of the plural computer interfaces 105 through the matrix switching circuit 103. In the embodiment, USB devices 101-1 to 101-2 are directly connected to the first computer surface 105 and the second computer interface 105 respectively. In addition, the USB devices having a hub function only control the connected computer interfaces 105 and only are controlled by the instructions from the connected computer interfaces. The other computer interfaces 105 are not concerned. The main controlling circuit 104 determines which computer interface should be connected by the USB devices having a hub function through the matrix switching circuit 103. The matrix switching circuit 103 may be an electronic matrix switching circuit or a mechanical matrix switching circuit. The USB devices having a controlling function connect to the main controlling circuit 104 through the console port switching interface 1031 in the matrix switching circuit 103 to control the plural computer interfaces 105 without switching the matrix switching circuit 103. Thus, when it is need to be operated proximate to the computer switch 100, the USB devices 101-1 to 101-2 having a controlling function may flexibly control the plural computer interfaces 105. Meanwhile, the console devices connected to the console port interface 102 still have a controlling function to control the plural computer interfaces 105. The effect of multi-user multi-console is achieved thereby, Referring to FIG. 2, it is a block diagram of the computer switch according to another embodiment of the present invention. Computer switch 200 includes a console port interface 202 having a console port for connecting console devices 202-1 to 202-2 which initially have a controlling function; a USB hub port interface 201 having hub ports for connecting USB devices 201-1 to 201-4, which initially have a hub function; plural computer interfaces 205 (N computer interface in the embodiment) having a computer port respectively for connecting a computer device (not shown); a matrix switching circuit 203 connected to the console port interface 202, the USB hub port interface 201 and the plural computer interfaces 205; and a main controlling circuit 204 connected between the matrix switching circuit 203 and the plural computer interfaces 205. The embodiment illustrates a special situation in which all of the console devices 202-1 to 202-2 connected to the console port interface 202 are connected to one of the plural computer interfaces through the matrix switching circuit 203. In the case, both the console devices 202-1 to 202-2 are switched as having a hub function. The USB devices 201-1 to 201-4 are connected to the main controlling circuit 204 through the console port switching interface 2031 in the matrix switching circuit. In other words, all of the USB devices are switched as having a controlling function. The original functions of the USB devices and the console devices are exchanged. Now, any one of the USB devices has a controlling function that controls plural computer interfaces simultaneously. Any one of the console devices only controls the connected computer interface 205.

Furthermore, the main controlling circuit 104 (204) dynamically detects the type of the connected devices. When it detects that the external device is a controlling device (e.g. a keyboard, a mouse, a playstick, a touch screen, or a written tablet), the device is switched as having a controlling function automatically according to the setting of the administrator. The setting may be enabled or disabled in the on screen display or by the hotkey on the keyboard.

Also, the computer interfaces 102 (205) store the information of the devices having a controlling function. As a result of the dynamic devices mapping function of the main controlling circuit, the computer interfaces 105 (205) updates the stored information of the devices and updates the connecting relationship of the devices accordingly.

What is claimed is:

1. A programmable controlled computer switch capable of switching between a controlling function and a hub function for a console device and a universal serial bus device, comprising:

a console port interface having console ports for connecting console devices, the console devices initially being with a controlling function;

a universal serial bus (USB) hub port interface having USB hub ports for connecting USB devices, the USB devices initially being with a hub function;

plural computer interfaces having a computer port respectively for connecting a computer device;

a matrix switching circuit connected to the console port interface, the USB hub port interface and the plural computer interfaces; and a main controlling circuit connected between the matrix switching circuit and the plural computer interfaces, wherein the console device and/or the USB device, acting as having the controlling function, either maintains as having the controlling function or switches as one having a hub function by means of switching of the matrix switching circuit, and the console device and/or the USB device, acting as having the hub function, either maintains the hub function or switches as one having a controlling function by means of switching of the matrix switching circuit, wherein one having the controlling function is connected to the plural computer interfaces in a sequence through the matrix switching circuit and the main controlling circuit, and one having the hub function is connected to one of the plural computer interfaces directly through the matrix switching circuit.

2. The computer switch as recited in claim 1,wherein the USB devices and/or the console devices having a hub function are connected to different computer interfaces by means of the matrix switching circuit.

3. The computer switch as recited in claim 1,wherein the USB devices are switched as having a controlling function automatically according to the type of the USB device.

4. The computer switch as recited in claim 1,wherein the initial controlling function of the console devices is maintained while the hub functions of the USB devices is maintained.

5. The computer switch as recited in claim 1,wherein the controlling function of the console devices are maintained while one or more of the USB devices are switched to one having a controlling function.

6. The computer switch as recited in claim 1,wherein controlling signals from devices having a controlling function are transmitted to the computer interfaces through the main controlling circuit and a bus in the order.

7. The computer switch as recited in claim 1,wherein the main controlling circuit acquires information of the devices having a controlling function by dynamic device mapping and sends the information to the computer interfaces so that the computer devices are connected and the information is updated.

8. The computer switch as recited in claim 1,wherein the matrix switching circuit is provided with a console port switching interface used as an interface between the devices having a controlling function and the main controlling circuit.

9. The computer switch as recited in claim 1,wherein the function of dynamic device mapping is enabled or disabled through a menu on the screen or a hotkey on the controlling keyboard, the function of dynamic device mapping is set a connected device of keyboard, a playstick, a touch screen, a written tablet or a mouse to be a device having a controlling function.

10. The computer switch as recited in claim 1,wherein the matrix switching circuit is an electronic matrix switching circuit or a mechanical matrix switching circuit.

* * * * *